(12) United States Patent
Chuang

(10) Patent No.: US 10,183,716 B2
(45) Date of Patent: Jan. 22, 2019

(54) SEAT CONNECTING DEVICE

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 15/436,950

(22) Filed: Feb. 20, 2017

(65) Prior Publication Data

US 2017/0297643 A1  Oct. 19, 2017

(30) Foreign Application Priority Data

Apr. 13, 2016 (TW) .................................. 105111529

(51) Int. Cl.
*B62J 9/00* (2006.01)
*B62J 11/00* (2006.01)

(52) U.S. Cl.
CPC ............... *B62J 9/006* (2013.01); *B62J 11/00* (2013.01)

(58) Field of Classification Search
CPC .................................. B62J 9/006; B62J 11/00
USPC .................................................. 224/427, 414
See application file for complete search history.

(56) References Cited

U.S. PATENT DOCUMENTS

| | | | | |
|---|---|---|---|---|
| 4,957,227 A * | 9/1990 | Trimble | .................... | B62J 1/28 224/275 |
| 5,332,134 A * | 7/1994 | Chen | .................... | B62J 7/04 224/422 |
| 5,657,914 A * | 8/1997 | Stapleton | ................ | B60R 9/045 224/309 |
| 5,718,134 A * | 2/1998 | Chang | .................... | B62H 5/003 70/18 |
| 5,931,361 A * | 8/1999 | Schwimmer | ............... | B62J 7/04 224/418 |
| 6,619,084 B2 * | 9/2003 | Kuo | ......................... | B62H 5/00 224/425 |
| 6,953,135 B2 * | 10/2005 | Litton | ...................... | B62J 9/001 224/414 |
| 7,654,550 B2 * | 2/2010 | Chuang | ..................... | B62J 7/04 224/427 |
| 9,187,142 B2 * | 11/2015 | McKenzie | ................. | B62J 7/04 |
| 2004/0211804 A1 * | 10/2004 | Lee | ......................... | B62H 5/003 224/427 |
| 2005/0011921 A1 * | 1/2005 | Yang | ....................... | B62H 5/00 224/425 |
| 2006/0061156 A1 * | 3/2006 | Bigolin | .................... | B62J 9/006 297/195.1 |

(Continued)

FOREIGN PATENT DOCUMENTS

| | | |
|---|---|---|
| TW | I360493 B | 3/2012 |
| TW | M512531 U | 11/2015 |

*Primary Examiner* — Peter Helvey
(74) *Attorney, Agent, or Firm* — Alan D. Kamrath; Kamrath IP Lawfirm, P.A.

(57) ABSTRACT

A seat connecting device includes a first base unit for coupling with a bicycle seat and a second base unit. The first base unit includes an extension having a first end portion with first teeth and a connecting portion. The second base unit includes a body and a connecting member. The body includes a second end portion with second teeth and a sliding groove extending through the second end portion. The connecting member extends through the sliding groove and is detachably connected to the connecting portion. The connecting member selectively presses against a side of the second end portion distant to the second teeth. The second teeth disengageably engages with the first teeth. A water bottle holder can be mounted to the body.

8 Claims, 5 Drawing Sheets

(56) References Cited

U.S. PATENT DOCUMENTS

| | | | | |
|---|---|---|---|---|
| 2007/0119888 A1* | 5/2007 | Chuang | ................... | B62J 11/00 224/427 |
| 2010/0059564 A1* | 3/2010 | Bretl | ........................ | A45F 3/16 224/414 |
| 2010/0237118 A1* | 9/2010 | Altshuler | ................ | B62J 11/00 224/414 |
| 2018/0037286 A1* | 2/2018 | Chuang | ................... | B62J 9/006 |

* cited by examiner

SEAT CONNECTING DEVICE

BACKGROUND OF THE INVENTION

The present invention relates to a seat connecting device and, more particularly, to a seat connecting device adapted to be mounted to a bicycle seat and adapted for mounting a water bottle holder.

Taiwan Utility Model No. M512531 discloses an auxiliary assembly for fixing purposes. The auxiliary assembly includes a fixing device and an auxiliary device. The fixing device includes a fixing portion and adjusting track portion. The fixing device can be fixed to an external object by the fixing portion. The auxiliary device includes at least one auxiliary portion and an adjusting end portion. The auxiliary device can be connected to an external object by the at least one auxiliary portion and can be pivotably connected to the adjusting track portion by the adjusting end portion. Furthermore, the adjusting end portion is movable relative to the adjusting track portion to adjust a connection position of the at least one auxiliary portion. The fixing device includes a first casing and a second casing fixed by a bolt to the first casing. The fixing portion is located on at least one of the first casing and the second casing. The adjusting track portion is located between the first casing and the second casing. The number of the at least one auxiliary portion is two. The adjusting end portion is an arcuate plate, and the two auxiliary portions are on two sides of the arcuate plate. The adjusting end portion is restricted to slide relative to (but cannot disengage from) the adjusting track portion. Thus, the auxiliary device can be pivotably mounted to the adjusting track portion. The fixing portion is used to fix the fixing device to a bicycle, and an external object (such as a water bottle) can be coupled to the auxiliary portions. The adjusting track portion permits sliding of the adjusting end portion to thereby switch the adjusting end portion between a first position and a second position.

When the auxiliary assembly is used to hold a water bottle, since the two auxiliary portions are located on two sides of the adjusting end portion and since the adjusting end portion is restricted to slide relative to the adjusting track portion, the adjusting portion is apt to slide relative to the fixing device under the action of the weight of the water bottle. Thus, the adjusting end portion will slide relative to the fixing device due to rigorous cycling and the weight of the water bottle while a user is cycling, causing falling of the water bottle or even accidents.

Thus, a need exists for a novel connecting device that mitigates and/or obviates the above disadvantages.

BRIEF SUMMARY OF THE INVENTION

An objective of the present invention is to provide a seat connecting device to avoid falling of the water bottle or accidents during cycling.

A seat connecting device according to the present invention includes a first base unit and a second base unit. The first base unit is adapted to be coupled to a bicycle seat and includes an extension having a first end portion and a connecting portion. The first end portion has a plurality of first teeth. The second base unit includes a body and a connecting member. The body includes a second end portion and a sliding groove extending through the second end portion. The second end portion has a plurality of second teeth. The connecting member extends through the sliding groove and is detachably connected to the connecting portion. The connecting member selectively presses against a side of the second end portion distant to the plurality of second teeth. The plurality of second teeth is disengageably engaged with the plurality of first teeth. A water bottle holder is adapted to be mounted to the body.

In an example, the first end portion includes a side located adjacent to the second end portion. The side of the first end portion has a concave face on which the plurality of first teeth is formed. The second end portion includes a side located adjacent to the first end portion. The side of the second end portion has a convex face. The sliding groove extends through the convex face. The convex face faces the concave face. The plurality of second teeth is formed on the convex face.

In an example, the first base unit includes a first plate, a second plate, and at least one adjusting member. The first plate is mounted to a side of the extension distant to the first end portion. The second plate is located on a side of the second plate distant to the extension. The at least one adjusting member extends through the first plate and is connected to the second plate. The at least one adjusting member is operable to adjust a spacing between the first plate and the second plate for clamping the bicycle seat.

In an example, the connecting portion has a screw hole extending through the concave face of the extension to a face of the extension adjacent to the first plate. The connecting member includes a bolt portion and a pressing portion. The bolt portion slideably extends through the sliding groove and is in threading connection with the screw hole. The pressing portion is mounted around the bolt portion and selectively presses against a portion of the second end portion adjacent to the sliding groove.

In an example, the second plate includes two pressing portions respectively on two opposite ends of the second plate. The at least one adjusting member includes two adjusting members. Each of the two adjusting members includes a threaded member. The threaded members extend through the first plate and are threadedly connected between the two pressing portions of the second plate. The two pressing portions and the first plate are adapted to clamp the bicycle seat.

In an example, the first base unit includes a screw extending through the first plate and is in threading connection with the screw hole.

In an example, the body includes two engaging portions respectively connected to two opposite ends of the second end portions and extending away from the first base unit. The sliding groove has two ends respectively extending toward the two engaging portions. The water bottle holder is adapted to be mounted to the two engaging portions.

The present invention will become clearer in light of the following detailed description of illustrative embodiments of this invention described in connection with the drawings.

DETAILED DESCRIPTION OF THE INVENTION

Figure 1:
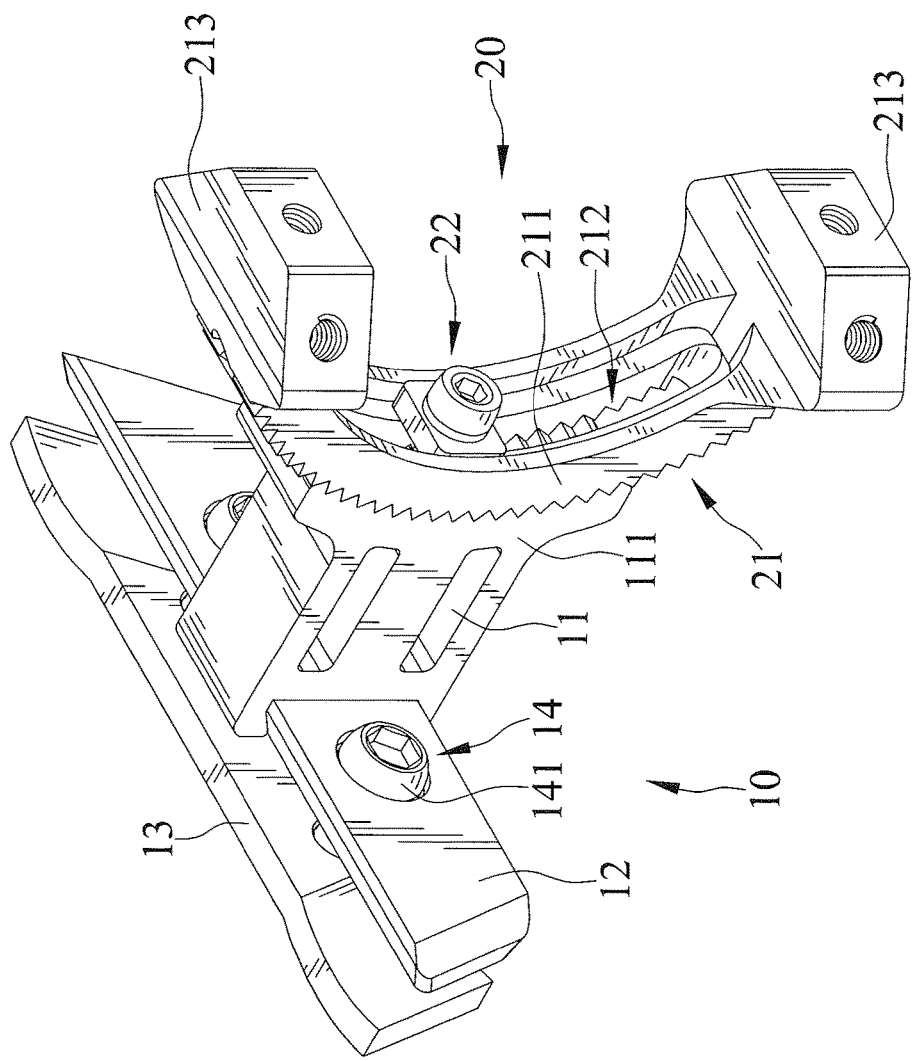
FIG. 1 is a perspective view of a seat connecting device according to the present invention.
Figure 2:
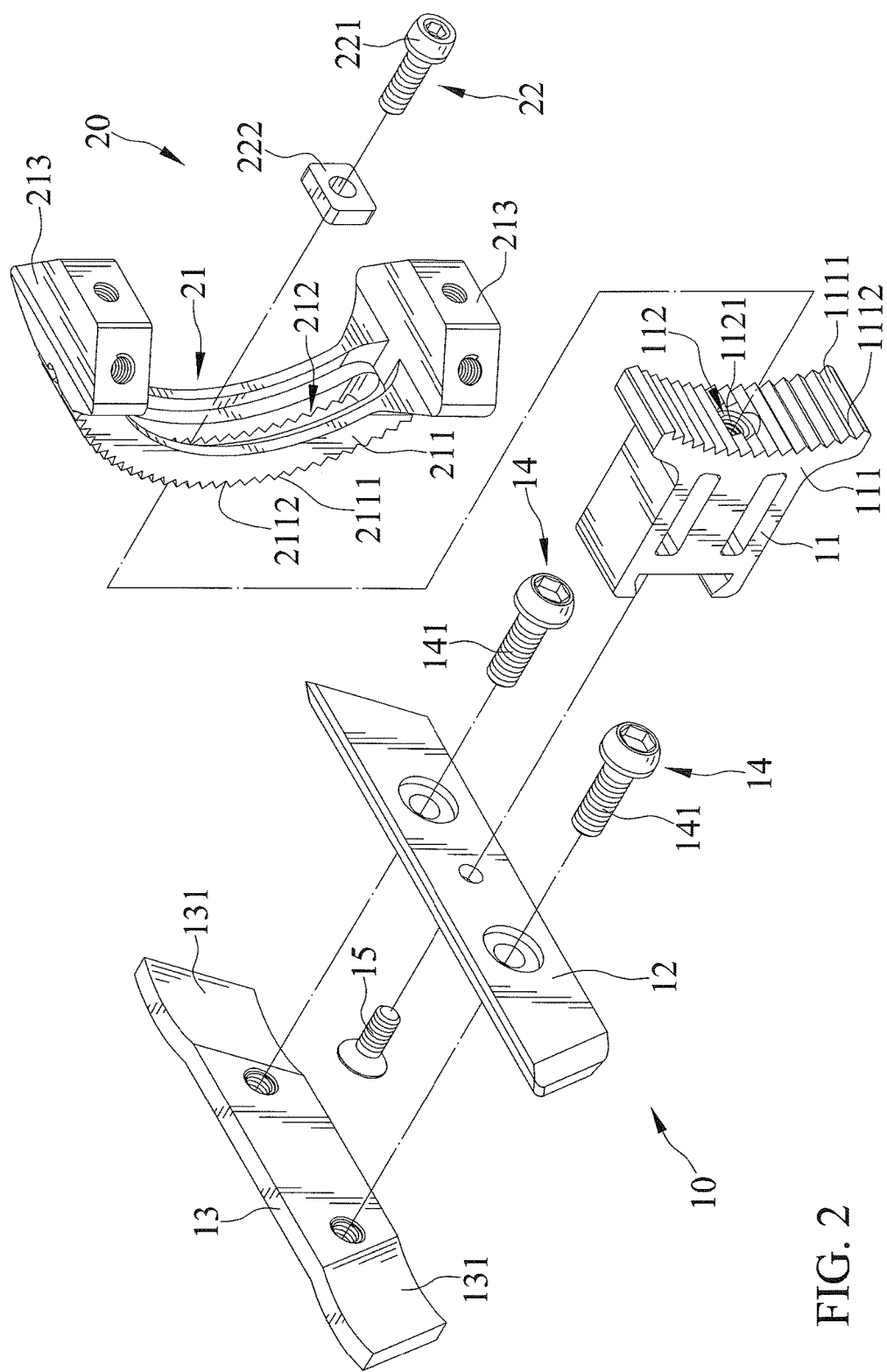
FIG. 2 is an exploded, perspective view of the seat connecting device of FIG. I.
Figure 3:
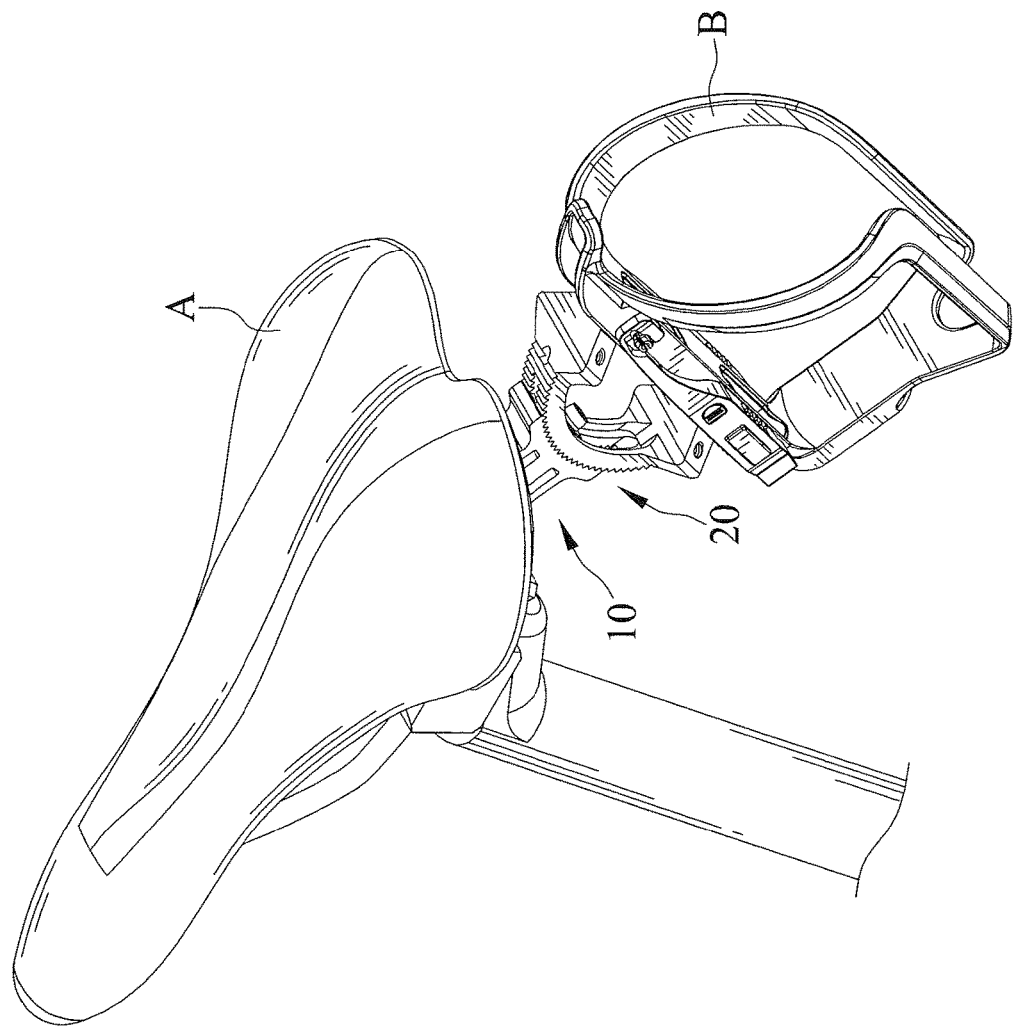
FIG. 3 is a diagrammatic perspective view illustrating use of the seat connecting device of FIG. 1 on a bicycle.

With reference to FIGS. 1-3, a seat connecting device according to the present invention includes a first base unit 10 and a second base unit 20. Two opposite ends of first base unit 10 are respectively connected to a bicycle seat A and second base unit 20. Second base unit 20 can be operated to adjust the relative position between second base unit 20 and first base unit 10. A water bottle holder B can be coupled to an end of second base unit 20 opposite to first base unit 10. Water bottle holder B is jointly movable with second base unit 20 relative to first base unit 10 to change its inclination angle. A user can adjust the inclination angle of water bottle holder B according to needs.

First base unit 10 includes an extension 11, a first plate 12, a second plate 13, at least one adjusting member 14, and a screw 15. First plate 12 is mounted to a side of extension 11. The second plate 13 is located on a side of the first plate 12 distant to extension 11. The at least one adjusting member 14 extends through first plate 12 and is connected to second plate 13. The at least one adjusting member 14 can be operated to adjust a spacing between first plate 12 and second plate 13 for clamping bicycle seat A. Screw 15 extends through first plate 12 and is in threading connection with extension 11.

Extension 11 has a first end portion 111 and a connecting portion 112. First end portion 111 is located on a side of extension 11 distant to first plate 12. Two opposite ends of connecting portion 112 respectively extend toward first end portion 111 and first plate 12. First end portion 111 has a plurality of first teeth 1111 and a concave face 1112. Concave face 1112 is formed on a side of first end portion 111 distant to first plate 12. First teeth 1111 are formed on concave face 1112. Connecting portion 112 has a screw hole 1121 extending through concave face 1112 of extension 11 to a face of extension 11 adjacent to first plate 12. Screw 15 is threadedly engaged with an end of screw hole 1121 adjacent to first plate 12.

Second plate 13 includes two pressing portions 131 respectively on two opposite ends of second plate 13. The at least one adjusting member 14 is disposed between the two pressing portions 131. The two pressing portions 131 and first plate 12 can clamp bicycle seat A. In this embodiment, first base unit 10 includes two adjusting members 14. Each adjusting member 14 includes a threaded member 141. The threaded members 141 extend through first plate 12 and are threadedly connected between the two pressing portions 131 of second plate 13.

Second base unit 20 includes a body 21 and a connecting member 22. Connecting member 22 extends through body 21 and is detachably connected to connecting portion 112. Connecting member 22 presses against a side of body 21 opposite to first base unit 10, such that body 21 can move toward first base unit 10. Body 21 includes a second end portion 211, a sliding groove 212, and two engaging portions 213. Sliding groove 212 extends from a side of second end portion 211 through the other side of second end portion 211. Connecting member 22 extends through sliding groove 212 and selectively presses against a portion of the second end portion 211 adjacent to sliding groove 212. The two engaging portions 213 are respectively connected to two opposite ends of second end portions 211 and extend away from first base unit 10. Sliding groove 212 has two ends respectively extending toward the two engaging portions 213. Water bottle holder B is adapted to be mounted to the two engaging portions 213.

Second end portion 211 has a plurality of second teeth 2111 and a convex face 2112. Convex face 2112 is formed on a side of second end portion 211 opposite to connecting member 22 and is located adjacent to concave face 1112 of the first end portion 111. Sliding groove 212 extends through convex face 2112. Second teeth 2111 is formed on convex face 2112. Convex face 2112 faces concave face 1112, such that second teeth 2111 can engage with first teeth 1111. Connecting member 22 includes a bolt portion 221 and a pressing portion 222. Bolt portion 221 slideably extends through sliding groove 212 and is in threading connection with screw hole 1121. Pressing portion 222 is mounted around bolt portion 221 and selectively presses against a portion of second end portion 211 adjacent to sliding groove 212.

Figure 4:
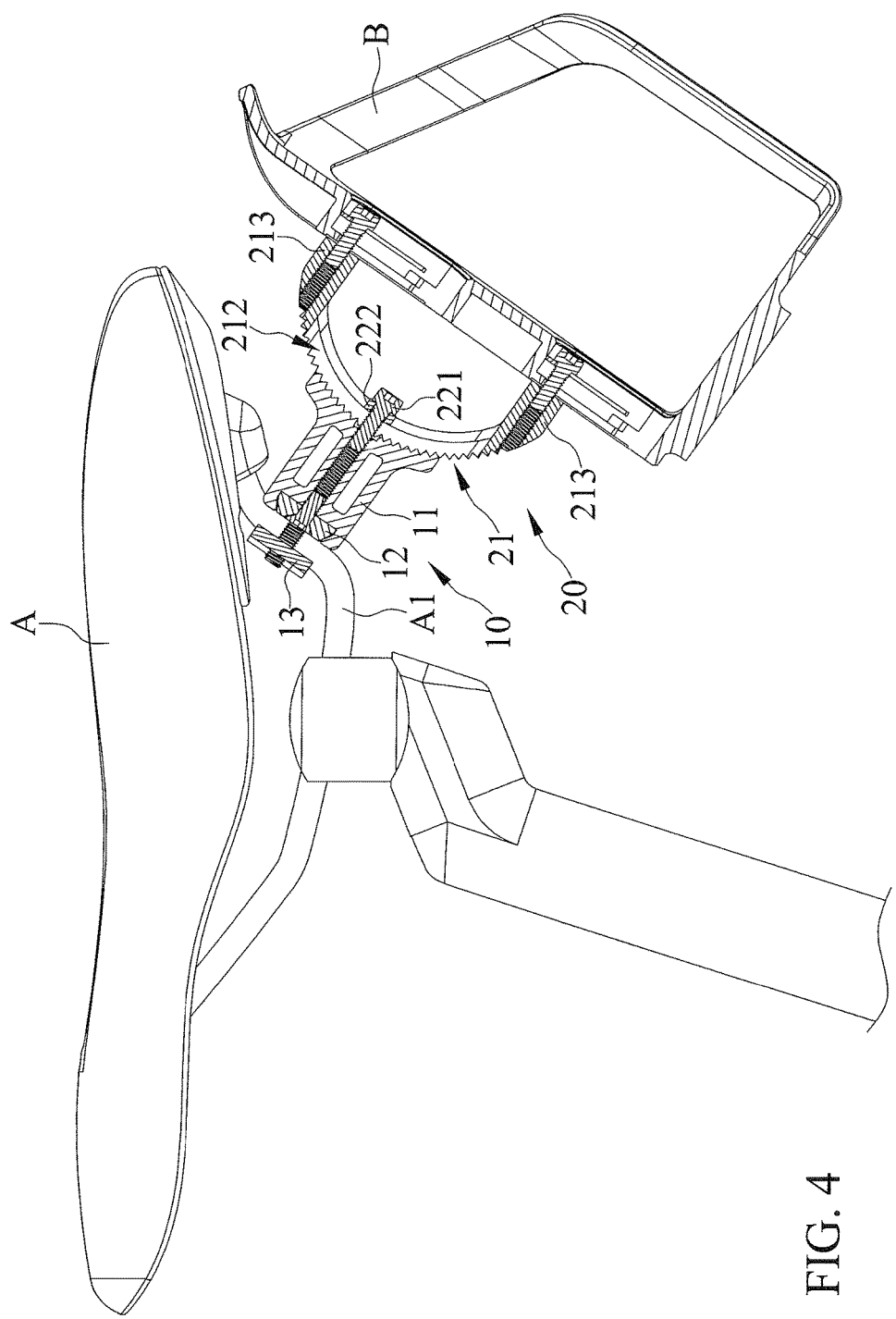
FIG. 4 is a partially cross sectioned view of FIG. 3, with the seat connecting device in a locking position.
Figure 5:
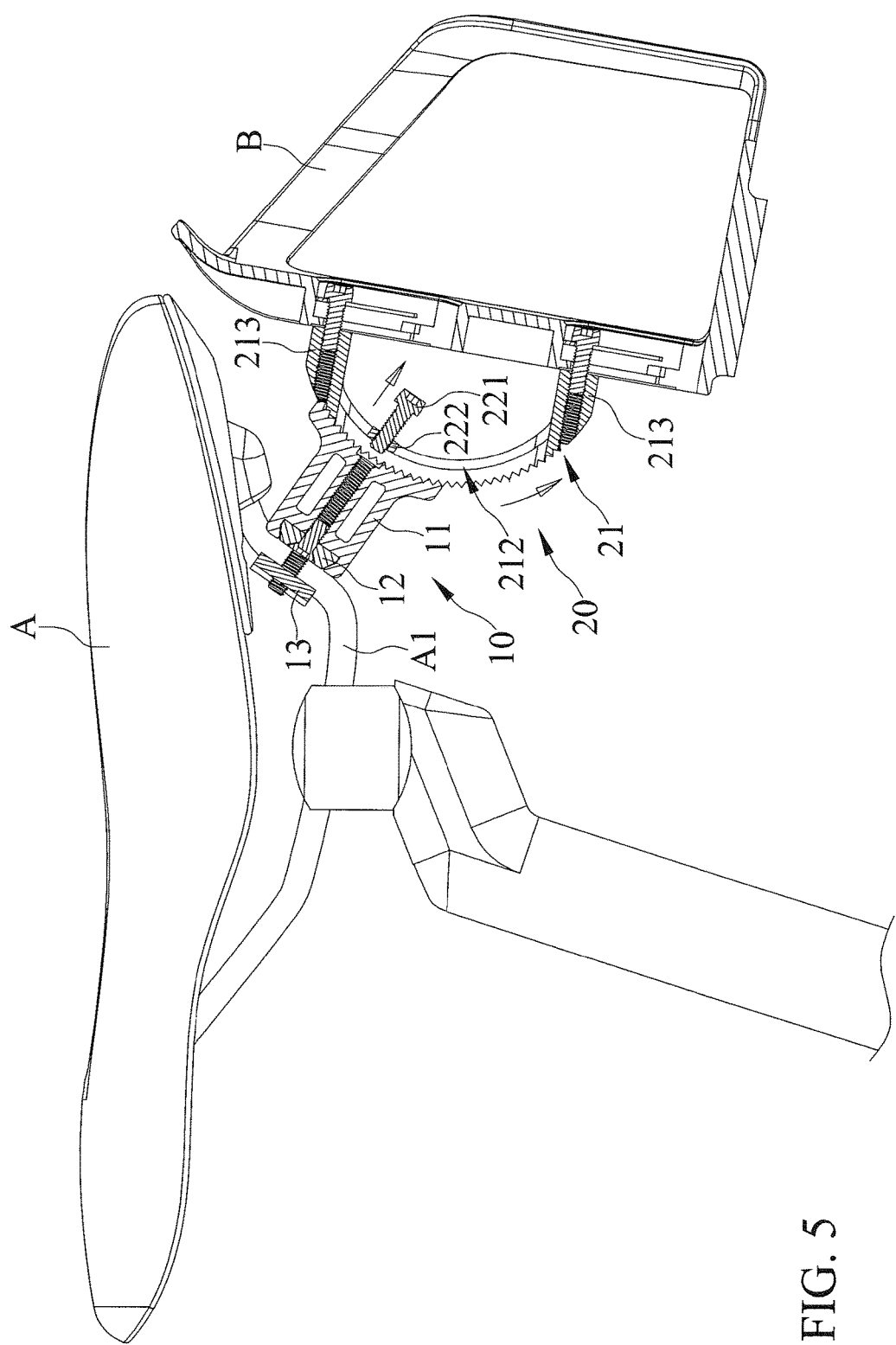
FIG. 5 is a view similar to FIG. 4, illustrating adjustment of the seat connecting device.

With reference to FIGS. 3-5, bicycle seat A includes two metal rods A1. The two threaded members 141 are rotated relative to second plate 13 to move second plate 13 toward first plate 12. One of the two pressing portions 131 of second plate 13 and first plate 12 together clamp one of the two metal rods A1. The other pressing portion 131 of second plate 13 and first plate 12 together clamp the other metal rod A1.

The seat connecting device can be switched between a locking position (FIG. 4) and an adjusting position (FIG. 5). When the seat connecting device is in the locking position, pressing portion 222 presses against second end portion 211 to engage second teeth 2111 with first teeth 1111, such that bolt portion 221 and sliding groove 212 cannot slide relative to each other. Thus, the positional relationship between first base unit 10 and second base unit 20 is fixed.

When it is desired to switch the seat connecting device from the locking position to the adjusting position, bolt portion 221 is rotated in a direction to disengage pressing portion 222 from second end portion 211. Second teeth 2111 are moved in a direction away from first base unit 10 to disengage from the first teeth 1111, such that body 21 can slide relative to bolt portion 221 in an extending direction of sliding groove 212. When the seat connecting device reaches the adjusting position, pressing portion 222 is disengaged from second end portion 211. Second teeth 2111 are disengaged from first teeth 1111. Thus, body 21 can slide relative to bolt portion 221 in the extending direction of sliding groove 212. Second base unit 20 slides relative to first base unit 10 to adjust water bottle holder B to the desired inclination angle demanded by the user.

In view of the foregoing, second teeth 2111 can engage with first teeth 1111 to increase the structural strength of the seat connecting device in the locking position When the user is riding the bicycle, the seat connecting device can withstand rigorous cycling and the weight of water bottle holder B, such that first base unit 10 and second base unit 20 are fixed in the same related position to avoid falling of the water bottle held by water bottle holder B.

Although specific embodiments have been illustrated and described, numerous modifications and variations are still possible without departing from the scope of the invention. The scope of the invention is limited by the accompanying claims.

The invention claimed is:

1. A seat connecting device comprising:
   a first base unit adapted to be coupled to a bicycle seat and including an extension having a first end portion and a connecting portion, with the first end portion having a plurality of first teeth;
   a second base unit including a body and a connecting member, with the body including a second end portion and a sliding groove extending through the second end portion, with the second end portion having a plurality of second teeth, with the connecting member extending through the sliding groove and detachably connected to the connecting portion, with the connecting member selectively pressing against a side of the second end portion distant to the plurality of second teeth, with the plurality of second teeth disengageably engaged with the plurality of first teeth, and with a water bottle holder adapted to be mounted to the body.

2. The seat connecting device as claimed in claim 1, with the first end portion including a side located adjacent to the second end portion, with the side of the first end portion having a concave face of an arcuate shape about an axis, wherein the plurality of first teeth is formed on the concave face, with the second end portion including a side located adjacent to the first end portion, with the side of the second end portion having a convex face of an arcuate shape about the axis, with the plurality of second teeth formed on the convex face, with the sliding groove having an arcuate shape about the axis and extending through the convex face and the plurality of second teeth, with the convex face facing the concave face, and with the concave face intermediate the plurality of second teeth and the axis.

3. The seat connecting device as claimed in claim 2, with the first base unit including a first plate, a second plate, and at least one adjusting member, with the first plate mounted to a side of the extension distant to the first end portion, with the second plate located on a side of the first plate distant to the extension, with the at least one adjusting member extending through the first plate and connected to the second plate, and with the at least one adjusting member operable to adjust a spacing between the first plate and the second plate for clamping the bicycle seat.

4. The seat connecting device as claimed in claim 3, with the second plate including two pressing portions respectively on two opposite ends of the second plate, with the at least one adjusting member including two adjusting members, with each of the two adjusting members including a threaded member, with the threaded members of the two adjusting members extending through the first plate and threadedly connected between the two pressing portions of the second plate, and with the two pressing portions and the first plate adapted to clamp the bicycle seat.

5. The seat connecting device as claimed in claim 1, with the body including two engaging portions respectively connected to two opposite ends of the second end portions and extending away from the first base unit, with the sliding groove having two ends respectively extending toward the two engaging portions, and with the water bottle holder adapted to be mounted to the two engaging portions.

6. The seat connecting device as claimed in claim 3, with the first end portion including a side located adjacent to the second end portion, with the side of the first end portion having a concave face on which the plurality of first teeth is formed, with the second end portion including a side located adjacent to the first end portion, with the side of the second end portion having a convex face, with the sliding groove extending through the convex face, with the convex face facing the concave face, and with the plurality of second teeth formed on the convex face.

7. The seat connecting device as claimed in claim 6, with the connecting portion having a screw hole extending through the concave face to a face of the extension adjacent to the first plate, with the connecting member including a bolt portion and a pressing portion, with the bolt portion slideably extending through the sliding groove and in threading connection with the screw hole, and with the pressing portion mounted around the bolt portion and selectively pressing against a portion of the second end portion adjacent to the sliding groove.

8. The seat connecting device as claimed in claim 7, with the first base unit including a screw extending through the first plate and in threading connection with the screw hole.

\* \* \* \* \*